Dec. 17, 1963     N. R. ABBERLY     3,114,345
BOTTOM FOR FLOATING EQUIPMENT
Filed Dec. 5, 1962     2 Sheets-Sheet 1
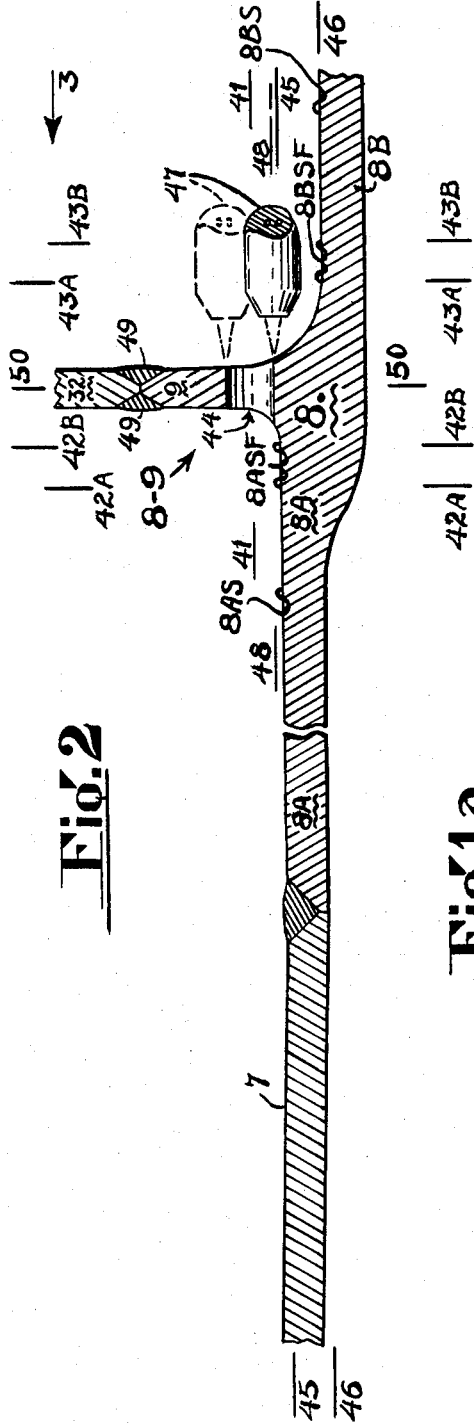
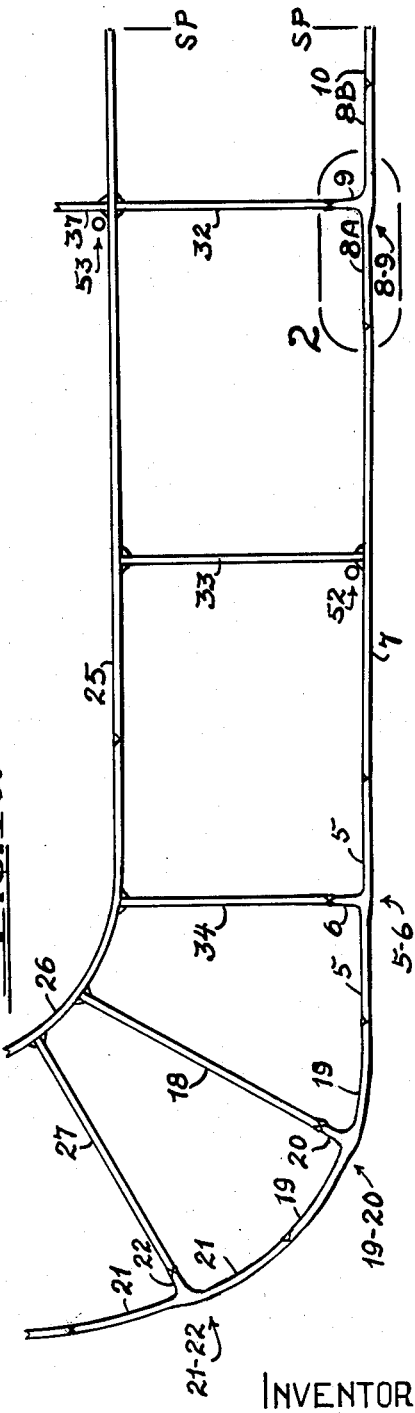
INVENTOR
Nicholas Rippen Abberly Dec. 17, 1963    N. R. ABBERLY    3,114,345
BOTTOM FOR FLOATING EQUIPMENT
Filed Dec. 5, 1962    2 Sheets-Sheet 2

INVENTOR
Nicholas Pippen Abberly

United States Patent Office 3,114,345
Patented Dec. 17, 1963

3,114,345
BOTTOM FOR FLOATING EQUIPMENT
Nicholas Rippen Abberly, % Malueg, 922 25th St. SE.,
Cedar Rapids, Iowa
Filed Dec. 5, 1962, Ser. No. 242,441
4 Claims. (Cl. 114—79)

This invention relates to the bottom shellplating and thereadjoining framing, bulkheads and/or swashplates in floating and other equipment holding fluid substances.

In present day hulls draining is made possible by the notching of the keelsons and of other platelike, elongated upwardly extending elements in their long-edge margins of bottom-plate contiguity. Each one of the margin unnotched sections, alternating with the notches, is bilaterally filletwelded to the bottom plating in two lines which, together with the end filletwelding across the element thickness at the ends respective to the two flanking notches, constitute actually a single continuous filletweld for the unnotched section. The face of each "end filletwelding" forms with the top surface of the bottom plating a reentrant angle, whose presence in one of the two critical zones of bend resistance and where most cracks originate, midship of the bottom and midship of the strength deck, is a thing not to be ignored in view of the fact that practically all cracks develop, in the case of welded hulls, in building-ways-deposited welds and in the final welding of subassemblies too large for furnace heat treatment.

In the instant invention, the welding of mutual affixment of the bottom plating and said platelike elements is of the continuous type and, particularly important to note, is appreciably drainhole-spaced, in contrast to the chain-type welds characterizing drainhole notches in conventional hulls, where small weld-face portions actually define parts of the notch faces. As is known to and practiced by persons skilled in the art and laying continuous welds, the building up of lengthwise extending locked-up stresses is precluded by selecting welding equipment, rod and method of a kind where a lower unit tensile strength value is accepted in order to gain increased ductility within the limit of no reduction of absolute tensile strength, which limit is realistic in view of greater continuous-weld footage in the case of continuous welds.

The object of this invention consists in improved drainability of bottom interiors and without entailing bottom strength loss, no reentrant angle characterizing the hole-defining surface and all said affixment welding being appreciably spaced from the drain holes.

Refer to the accompanying drawing.

FIGURE 2 is an enlarged, fragmentary, cross sectional view of parts within the ellipse 2 in FIGURE 1.

Figure 1B:
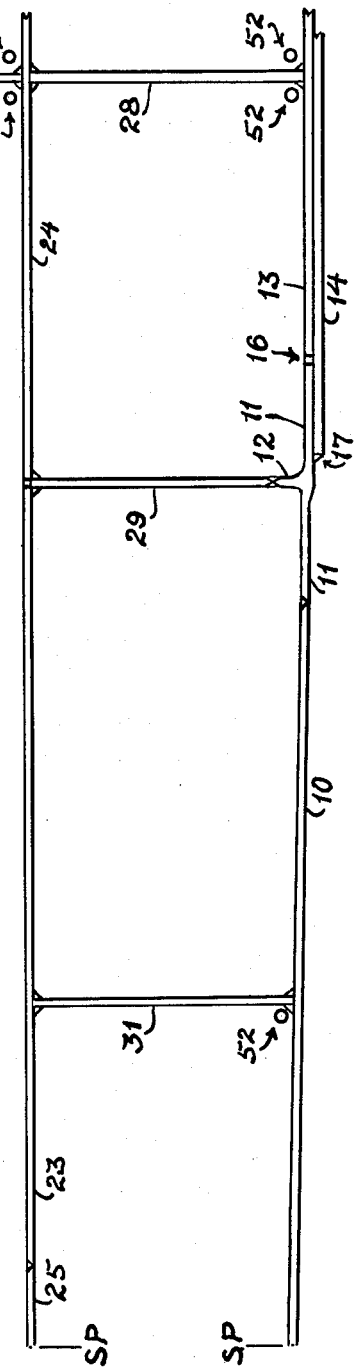
FIGURE 1 is a fragmentary, schematic, one-half-symmetrical cross sectional view facing fore, in the bottom zone, of an invention incorporating ocean-going vessel. The figure is split into two, "FIGURE 1a" and "FIGURE 1b," respectively on two sheets, the split plane being indicated by the symbol, SP—SP.

FIGURE 1 shows, in succession from the port bilge zone to the vertical keel 28, the T-shape 5—6, the bottom plate 7, the T-shape 8—9, the bottom plate 10, the T-shape 11—12, the port half of the horizontal keel 13 and the port half of the rubbing or false keel 14. Keel 13 is sufficiently strength-bonded to keel 14 by adequate plugwelding and, contributively, by the buttwelding to T-shape 11—12 with buttwelds 16. Additional integration of the various thereat elements is effected by the plugwelding of one arm of T-shape 11—12 to keel 14 and by the external filletwelding at 17 of keel 14 to T-shape 11—12. T-shapes 5—6, 8—9 and 11—12 include respectively bottom plate portions 5, 8 and 11, and respectively stems 6, 9 and 12. The port bilge outer shellplating consists of the bilge outer plate portions 19 and 21, the respective stems being 20 and 22. Portion 19 fairs into the outer bottom plating of the vessel and portion 21 fairs into the outer side plating.

This design of vessel, based on inner sides as well as inner bottom, is characterized by the absence, in each bilge zone, of the usual single margin plate, whose position would approximate that of bilge keelson 18. Instead, the tank top (inner bottom) has a port half, including plates 25 and 23 and one half of plate 24, and fairs into bilge inner plate 26, which in turn fairs into nondepicted inner side plating. A similar disposition of corresponding elements obtains in the case of the starboard half. Bilge stringer 27 coacts with bilge keelson 18 to interbrace plate 26 and T-shapes 21—22 and 19—20, thereby establishing, in the critical bilge zone of direction change between the bottom and the side of the vessel, adequate strength.

Vertical keel 28 is flanked by two five-keelson sets. The port set consists of the two integral keelsons 31 and 33 and of the three integrated keelsons consisting, each, of a relatively large keelson plate and, buttwelded to the bottom edge thereof, a relatively small upstanding platelike portion or stem, parts of said three T-shapes. The three integrated keelsons include respectively the keelson plates 34, 32 and 29 and the thereto buttwelded stems 6, 9 and 12. Comparably, stems 22 and 20, respectively integral with outer bilge plate portions 21 and 19, are respectively buttwelded to the relatively large plate 27 of the bilge stringer and to the relatively large plate 18 of the bilge keelson to constitute two strength-important fore-and-aft-extending frames for the bilge. A centerline longitudinal bulkhead, separating the port main tanks from the starboard main tanks, is indicated by 36. Separating the port main tanks from the port wing tanks is the port longitudinal bulkhead 37. Tiny circles 52, schematically cross sectionally represent channels, pump lines and ports along watertight junctures of bottom plating with keelsons and the vertical keel, and tiny circles, 53, represent channels, pump lines and ports along junctures of the tank top with the longitudinal bulkheads.

Figure 3:
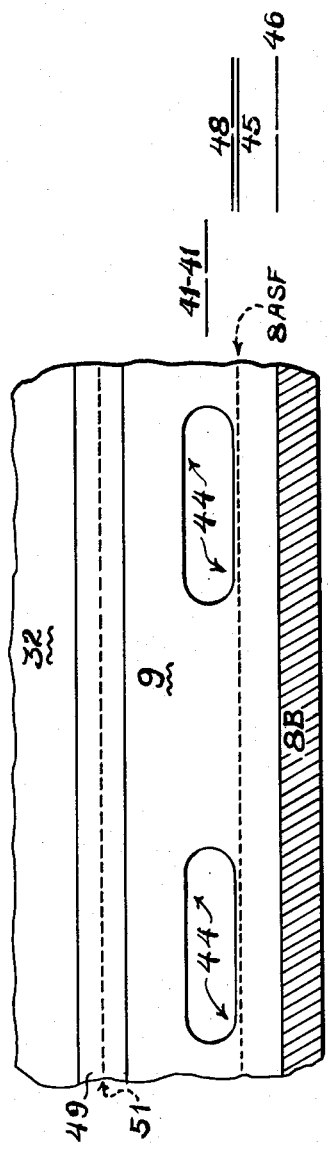
FIGURE 3 is a side elevation view, on the same scale, of the same, seen as indicated by arrow 3 in FIGURE 2.

Refer to FIGURES 2 and 3. The elongated, prostrate, underneath, relatively large bottom plate portion or flange of the integral, elongated, modified and inverted T-shape 8—9, is indicated by 8. The thereabove, long-edgewise adjoining, relatively small platelike portion of T-shape 8—9 or stem, is indicated by 9. The plane of delimitation between the flat stem faces and the radius or fillet surfaces in the root zones is indicated by 41—41. The most stem-proximal limits of flatness of the inside surfaces of the two flange main portions or arms, 8A and 8B, are respectively indicated by 42B and 43A. The intersections of planes 42A and 42B with the inside surface of arm 8A, and those of planes 43A and 43B with the inside surface of arm 8B, respectively define two small flat surface portions, 8ASF and 8BSF. The collective axis of the elongated holes 44, corresponding to the long dimensions thereof, happens to lie in plane 41—41, although it may equally advantageously lie outside it, offset in either direction to a small degree. The distance between planes 42A and 42B and that between planes 43A and 43B respectively equal the mean thickness of arm 8A and that of arm 8B. The two arm inside surfaces are indicated by 8AS and 8BS. The two planes, respectively of the two said small flat surface portions, are indicated by 45 and 46. Character 47 represents, respectively in solid line and in dotted line, a hole burning nozzle when in the most arm-proximal position and in the most arm-distal position. Of the two small flat surface portions, 8ASF is nearer to the hole collective axis. Character 48 indicates the plane of said most arm-proximal position. One of the halves of the X-type buttweld affixing stem 9 to the lower margin of keelson plate 32 is indicated by 49. The long axis of T-shape 8—9 lies in plane 50. The juncture of the two respective edges of stem 9 and keelson plate 32 is indicated by dotted line 51 in FIGURE 3. Disposing the two small flat surface portions in two mutually spaced planes has as its purpose the providing of sufficient clearance for the equipment burning the stem holes, whose axes preferably approximate rectangularity to the stem plane of symmetry, and whose flange-proximal portions of the hole-defining surfaces are spaced from the nearer small-flat-surface plane, which is that of the fluid-departing arm, by a distance that measures less than the hole short-axis dimension, but recommendedly less than thirteen sixteenths thereof, and, better still, less than five eighths thereof. This distance range is necessitated by the various thicknesses of the flanges in different inclusive structures. In contemplation are distances, between the most arm-proximal portions of hole-defining surfaces and the inner surface of the fluid-departing arm, of one eighth inch or less, which permits practically perfect draining. If desired, even the one eighth inch (or less) can be ground off, at the cost of increased labor. The perforating of the stem parallelwise with the plane of the fluid-departing arm inner surface precludes thinning or any other adverse effect on said arm thereat. Recommended is the disposing of the T-shapes vertically, with the fluid-departing arm underneath when burning the holes, thereby minimizing spatter deposits on the shape.

Summarily described, the invention resides in a special structure, an elongated integral T-shape, which may be extruded, particularly if executed in plastic or one of the light metals, or continuously cast, or, as recommended, in hot rolled steel. It has been conceived primarily as a part of the bottoms of floating equipment but is advantageously applicable also to certain types of tanks, provided with bulkheads. In floating equipment, envisagable types are ocean-going tankers and coastwise and sheltered waterways tankers, transporting liquids or gases or pumpable granular material. The T-shape is cross sectionally uniform excepting for the successively spaced elongated holes. In all applications the T-shape appears inverted. The flange consists of the relatively small ultimate margin of the stem and, flanking it, of the relatively large two arms, which may be of equal or unequal lengths, cross sectionally. The stem is an element that is complete for at least one distinct function. It may be a frame, a frame bottom margin, a bulkhead, a bulkhead bottom margin, a swash plate, a swash plate bottom margin. This means that the invention is incorporable in prostrate plating that is either actual bottom plating or is inner bottom (tank top) plating and therefore describable as prostrate plating in the vicinity of the bottom of the structure, or in prostrate plating that is bottom plating of a tank compartment elsewhere in an inclusive structure, particularly when it is a ship.

With extruding or continuous casting, stem length, in cross sections, may approximate arm length. In hotrolled steel, in small and medium sizes, arm length must considerably exceed stem length. As usual in T-shapes of hotrolled steel, strength considerations and good rolling mill practice dictate more or less fairing of stem faces into the inside surfaces of the arms, the root zones being characterized by fillets (with radius surfaces). Adjoining each radius surface is a small flat portion of the arm inner surface with a cross sectional length equal to the arm mean thickness at least. The two small flat portions are disposed in two mutually spaced parallel planes. In consequence, the flange assumes a joggled form. When constituting bilge outer plating, T-shapes have their arms recommendedly curved. In such cases the arm inner surfaces are not in parallel planes. Otherwise they are in parallel planes, or nearly so.

In FIGURE 2 the fluid being drained flows from the left to the right in the view. The therein depicted complete arm is the fluid-departing arm. The fragmented one at the right is the fluid-receiving arm.

Hydrodynamic as well as strength considerations dictate a minimally abrupt fairing of the arm outer surfaces into one another. Inherent in gentle fairing thereat is a considerable massing of material in the stem-flange-juncture zones, whereby highly desirable augmented moment values are obtained precisely where they are most effective, namely, in structure bottommost zones. In the case of the larger tankers, limitations in channel depths in ports served by them necessitate a large length:depth ratio in the hull, whereupon resistance against breaking in two in heavy seas is correspondingly lessened. The recommended considerable massing of material in the fairing by extending the thickened zone well into the fluid-discharging arm provides more resistance against tensile stresses tending to break the hull when in a sagging state in heavy seas.

Where plain bottom plates alternate with T-shapes, the former should preferably be given a little individual deadrise, e.g., two degrees. For economical fabricating, a completely horizontal position for each T-shape is advisable. If not, then a horizontal position for at least the fluid-receiving arm, thereby simplifying the chocking when drydocked; this would however involve a bending operation on every such T-shape.

Stems can serve also as the bottom chords of truss-type framing for the bottom plating.

I claim:

1. An inclusive structure that includes prostrate metal plating and is adapted to contain a fluid substance immediately overlying the plating, the structure including a plurality of elongated, integral, modified, inverted T-shapes, each of at least most of the cross sectional views thereof disclosing a relatively long prostrate flange and a relatively short upwardly extending stem, the flanges jointly constituting at least part of said prostrate plating, each stem being perforated to make a plurality of elongated flange-adjacent holes, the long axes of said holes forming a collective axis paralleling the long axis of the respective T-shape, the flange consisting of two arms, each arm inside surface and one of the two faces of the respective stem flanking, in a root zone of the T-shape, a radius or fillet surface, said each inside surface including a small flat portion adjoining the radius surface and presenting a length equal to the mean thickness of its respective arm, the two said small flat surface portions in the T-shape lying respectively in two mutually spaced substantially parallel planes.

2. A structure as described in claim 1, said collective axis being spaced from the nearer said parallel plane by a distance that measures less than the short-axis dimension of the holes.

3. A structure as described in claim 1, said collective axis being spaced from the nearer said parallel plane by a distance that measures less than thirteen sixteenths of the short-axis dimension of the holes.

4. A structure as described in claim 1, said collective axis being spaced from the nearer said parallel plane by a distance that measures less than five eighths of the short-axis dimension of the holes.

References Cited in the file of this patent

UNITED STATES PATENTS

| | | |
|---|---|---|
| 561,472 | Ashlin | June 2, 1896 |
| 1,405,844 | Hill | Feb. 7, 1922 |
| 2,158,214 | Bester | May 16, 1939 |
| 2,465,251 | Meier | Mar. 22, 1949 |
| 2,520,645 | Meier | Aug. 29, 1950 |

FOREIGN PATENTS

| | | |
|---|---|---|
| 91,585 | Norway | Apr. 28, 1958 |
| 381,293 | Great Britain | Oct. 6, 1932 |
| 383,845 | Great Britain | Nov. 24, 1932 |

OTHER REFERENCES

The Welding Encyclopedia, 13th ed., 1951, pages 832, 833 relied on.